United States Patent [19]
Burnham et al.

[11] 3,784,742
[45] Jan. 8, 1974

[54] GROUND-BASED FLIGHT SIMULATING APPARATUS

[75] Inventors: Donald Burnham, Bletchley; Samuel Walter Honeyball, Aylesbury; Archer Michael Spooner, Henley; Daniel Richard Lobb, Farnborough, all of England

[73] Assignee: Redifon Limited, London, England

[22] Filed: May 8, 1972

[21] Appl. No.: 251,258

[30] Foreign Application Priority Data
May 12, 1971  Great Britain.................... 14494/71

[52] U.S. Cl... 178/7.88, 178/DIG. 20, 178/DIG. 35, 350/29, 350/123, 350/174
[51] Int. Cl.. G02b 17/00, G02b 27/10, G03b 21/56
[58] Field of Search.................. 178/7.88, DIG. 20; 350/123, 29, 170

[56] References Cited
UNITED STATES PATENTS
3,486,242  12/1969  Aronson ..................... 178/DIG. 20
3,432,219  3/1969  Shenker ............................... 350/29

FOREIGN PATENTS OR APPLICATIONS
571,816  5/1924  France .............................. 350/123

Primary Examiner—Howard W. Britton
Attorney—Roberts B. Larson et al.

[57] ABSTRACT

An infinity visual display for a ground-based vehicle or craft simulator. A view of terrain passed over is obtained by a television camera controlled in simulated motion over a terrain model. The view is projected by a television projector onto a back-projection screen, the front of which screen is viewed by trainee crew by way of a collimating mirror. The television projector and back-projection screen are located overhead of the trainee crew and the collimating mirror in front, facing upwards. To provide for this inclined viewing axis of the screen relative to the projector axis to the screen, the screen must have a diffusing transmission characteristic and preferably a ray-deflecting characteristic also.

11 Claims, 8 Drawing Figures

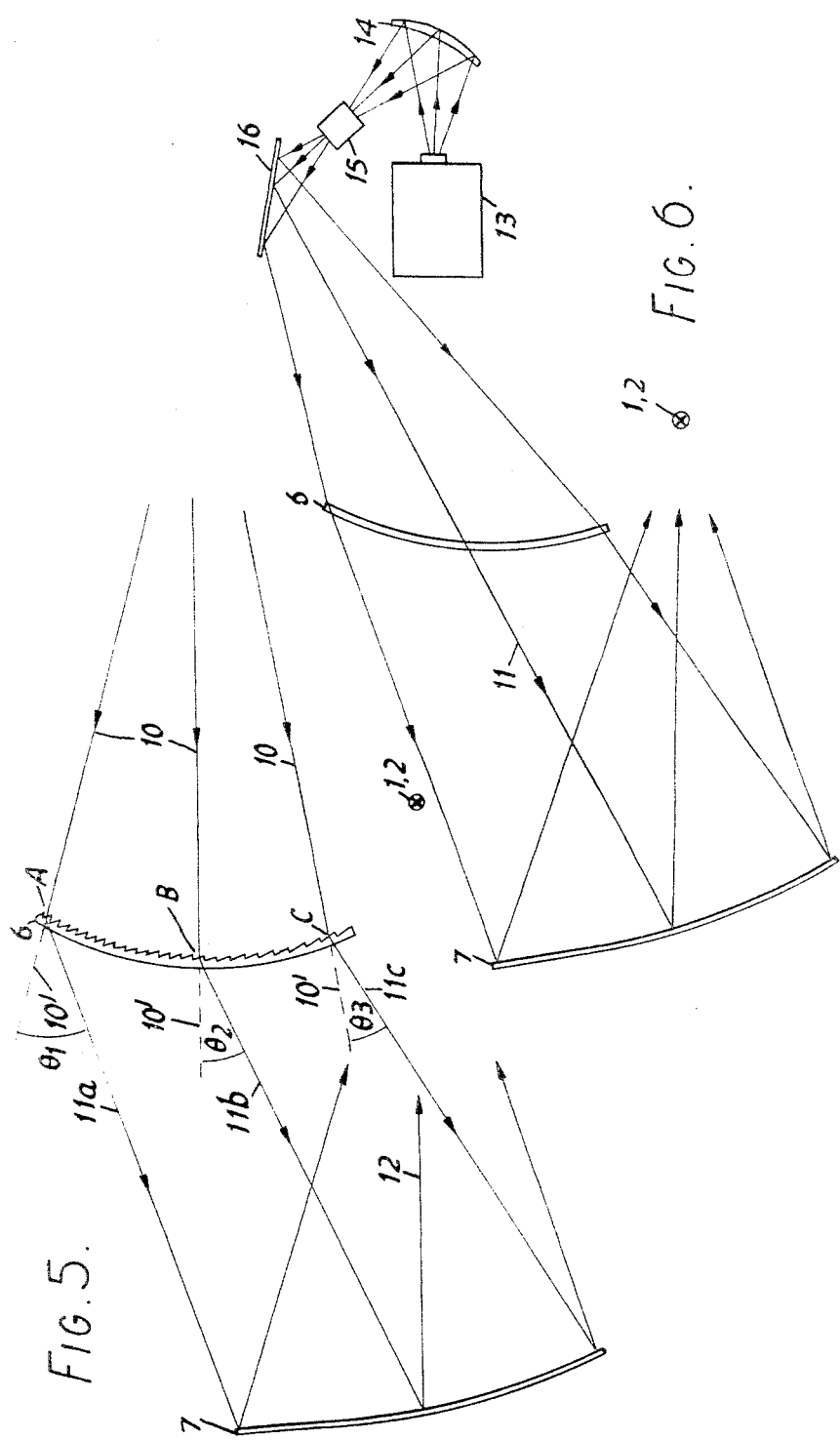

GROUND-BASED FLIGHT SIMULATING APPARATUS

This invention relates to visual display apparatus and particularly to infinity visual display apparatus for ground-based vehicle simulators.

Ground-based vehicle simulators are used to simulate the actual motion of a vehicle or craft, for the exercise of trainee crews, without use of an actual vehicle or craft. The present invention will be described in relation to aircraft flight simulation apparatus, but the invention may be applied to simulators for other vehicles and generally to apparatus for simulating a real-life scene.

An aircraft simulator includes a dummy flight deck which is occupied by the trainee crew during an exercise. Commonly, the dummy flight deck is moved by a motion system, to reproduce the accelerations of an aircraft in flight. It is also provided with a visual display, simulating a view of the terrain over which the simulated flight is taking place, which is visible to the pilot and co-pilot through the dummy flight deck windows. The present invention is concerned with such visual display.

It is known to use a scale model of terrain over which the aircraft is to fly and to provide a visual display on a projection screen in front of the flight deck windows by means of closed circuit television apparatus having a camera which views the model and one or more projectors to produce an image, which may be in natural colours, on the projection screen.

The object of the present invention is to provide improved apparatus for providing such visual displays which overcomes certain limitations of the known apparatus described above.

With the known visual display apparatus described, the projection screen is situated typically some 8 feet from the pilots, whereas in actual flight the scene viewed is in the far distance. This limitation means that in viewing the screen the accommodation and convergence of the eyes of the pilots is incorrect and the parallax between the window bars and the distant scene with head movement is not as it appears in reality.

Furthermore, when it is desired to present the visual display to two pilots seated side by side, known practice is to position the projector over the head of the pilot who is flying the simulated aircraft, so that his view is laterally undistorted, and to accept as unavoidable the lateral distortion seen by the co-pilot due to his viewing the screen at an horizontal angle to the projection axis.

Since there is a vertical angular separation between both pilot's eyes and the projection axis, vertical keystone distortion and vertical non-linearlity of the image is present for both pilots, although in practice this is not so serious as the lateral distortion seen by the co-pilot.

Accordingly, the present invention provides visual display apparatus for providing a collimated visual display for viewing by at least one subject, comprising a concave mirror positioned for viewing by the subject, a curved rear-projection screen position substantially at the focal surface of the concave mirror and an optical projector positioned to project a visual scene onto the rear-projection screen.

The line joining the centres of the mirror and the screen may be oblique to the projector axis.

Preferably, said line joining the centres of the mirror and screen is oblique in the bisecting vertical plane of the dummy flight deck of the simulation apparatus, the pilot's line of view of the mirror being substantially horizontal and the projector axis being above the roof of the dummy flight deck.

Preferably the mirror is substantially spheroidal in shape, the axis of the spheroid of which it forms a part lying substantially in the vertical plane bisecting the dummy flight deck of the simulation apparatus, the lower focus of the spheroid being at or near the mid point of the volume of space from which the image is to be viewed, and the upper focus of the spheroid being above a rearward section of the simulated aircraft, so that the axis of the spheroid is oblique to the vertical.

The projector may be a closed-circuit television image projector. The said image may then be provided using a non-linear scanning raster, to compensate for the distortion inherent in the projector-screen-mirror system and the distortion due to the oblique projector-to-screen and screen-to-mirror paths.

The rear projection screen may have solely a diffusing light-transmitting characteristic, whereby an incident light ray from the projector produces an emergent cone of rays, part of which cone is directed towards the said mirror. However, the rear-projection screen may also be constructed with a refracting structure, which deflects the incident light so that the axial ray of the emergent cone of rays is directed towards the said mirror and, after reflection therefrom, into the dummy flight deck towards the pilot.

In order that the invention may be readily carried into practice, one embodiment thereof will now be described in detail, by way of example, with reference to the accompanying drawings, in which :

FIG. 5 is a diagram showing a preferred back-projection screen material of a graduated prismatic form;

FIG. 6 is a diagram showing a modified form of the arrangement of FIGS. 1 and 2.

Figure 1:
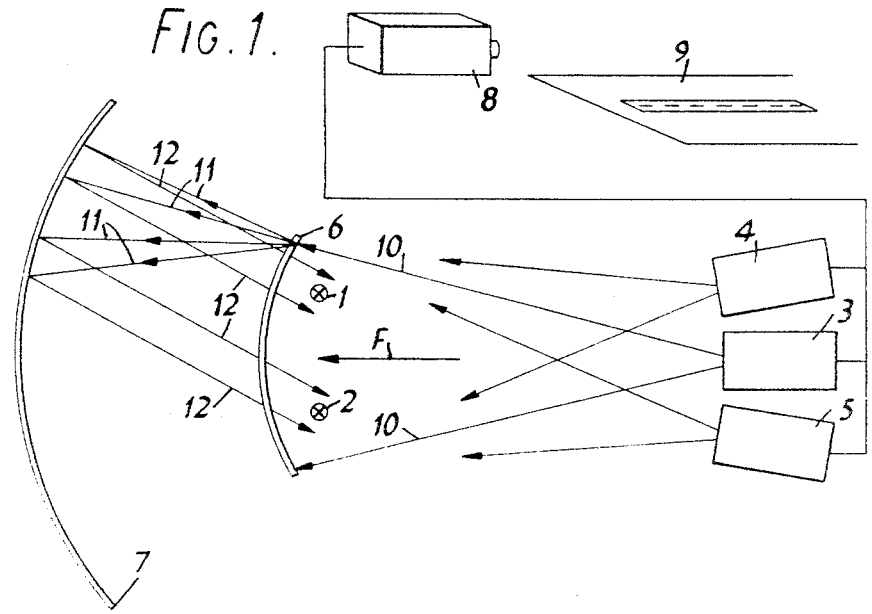
FIG. 1 is a plan view of projection apparatus for an infinity visual image display system.
Figure 2:
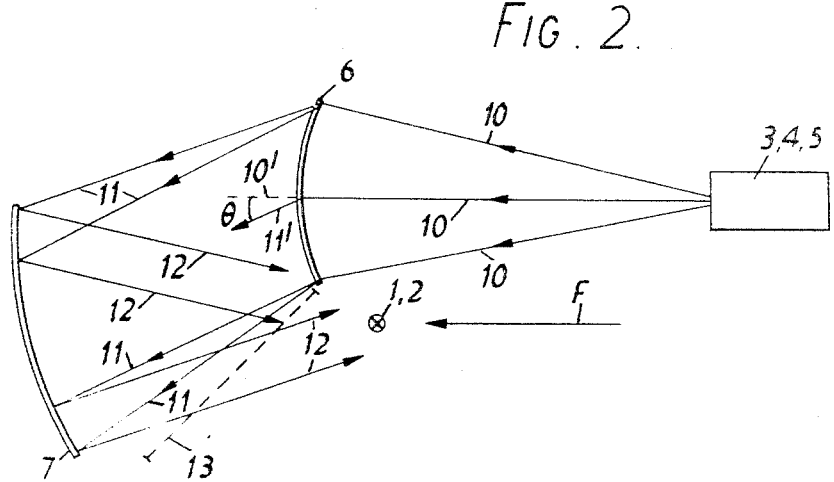
FIG. 2 is a side elevation view of the projection apparatus of FIG. 1.

In FIGS. 1 and 2, a pilot 1 and co-pilot 2 are represented by their head positions when seated in side-by-side relationship in the flight deck of a flight simulator. They then view the visual display provided, in the forward direction indicated by the arrow F, through the windows of the flight deck.

For simplicity, the structure of the flight deck is not shown in FIGS. 1 and 2, except that the flight deck window is shown in broken line 13 in FIG. 2.

Further, in FIGS. 1 and 2, there is shown a television image projector 3 and associated back projection screen 6. The projector 3 is connected to a television camera 8 which is positioned to view a model 9 of the terrain over which a simulated flight is to be made.

Optional additional projectors 4 and 5 are indicated in broken lines, representing the case where such further projectors are used for presentation of a visual display in natural colour.

The screen 6 presents a concave back surface towards the projector 3 and hence a convex viewed surface towards a concave spheroidal mirror 7.

The projection path from projector 3 to screen 6 is represented by the cone of rays 10—10. The viewed face of screen 6 has a light scattering characteristic, as discussed more fully later herein, and divergent rays from a single elemental area of the screen are represented at 11, 11'. The face of screen 6 lies substantially in the focal surface of the concave mirror 7 and the rays 11, 11' are reflected by the mirror 7, as indicated by the return rays 12, 12', forming a collimated image which is viewed by the pilots 1 and 2 through the flight deck window 13.

The mirror 7 is obliquely orientated to the viewing direction F, so that the screen may be placed above the pilot's line of sight, as shown in FIGS. 1 and 2. The screen 6 is substantially normal to the axis of projector 3. The projector axis is vertically displaced from the pilots' viewing direction F.

This arrangement enables the projectors 3, 4 and 5 and the screen 6 to be placed above the heads of the pilots, in this example on a superstructure above the dummy flight deck, and enables the mirror 7 to be located with its centre on the horizontal line extending forwards from between the pilot and co-pilot, as indicated by the arrow F in the two figures.

Figure 3:
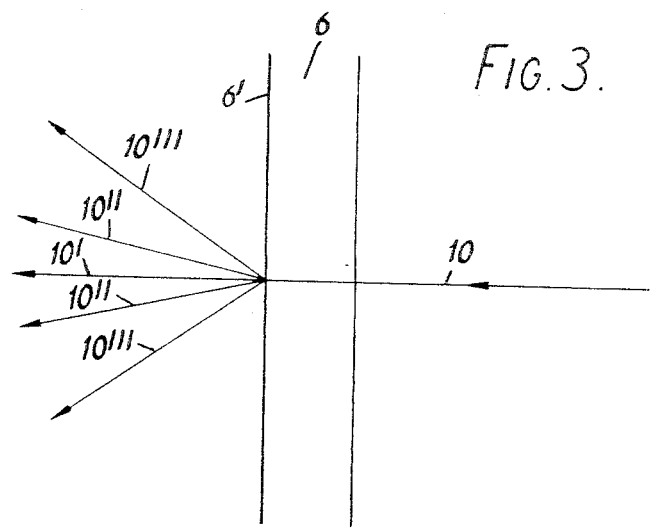
FIG. 3 is an enlarged vertical cross-section showing, in side-elevation, a small portion of a known back-projection screen material.

Referring, now, to FIGS. 3 and 4, there are shown light deflecting and light scattering characteristics of back projection screen materials suitable for the screen 6.

Referring first to FIG. 3, there is shown a known back-projection screen material having a strongly diffusing characteristic with maximum emergent light intensity in the same direction as the incident rays.

Thus, in FIG. 3, if ray 10 represents an incident ray from projector 3, the emergent rays are diffused over a cone $10''' - 10'''$, with maximum intensity in the direction of ray 10', which is in line with the incident ray 10. In the example of FIG. 3, ray 10 is normal to the screen rear face and the emergent cone progressively diminishes in light intensity from the axial ray 10' to the peripheral rays 10''', rays 10'' being of intermediate intensity.

As shown in FIG. 2, the mirror 7 lies below the projector axis. The material of the screen 6 must be strongly diffusing so that light leaving any point of the screen reaches the appropriate point of the mirror 7 to provide a collimated image to the observers 1, 2.

It has been found in practice that acceptable overall brightness and acceptable uniformity of brightness is obtained with a simple diffusing screen of the form shown in FIG. 3. In FIG. 3, the on-axis ray is shown at 10' and the divergent cone of rays due to screen diffusion by the rays 10'' and 10'''.

Figure 4A:
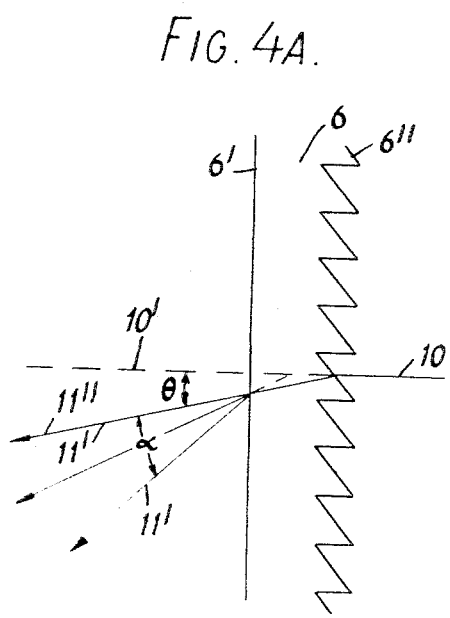
FIG. 4A is a similar cross-section showing an improved back-projection screen material or prismatic form.
Figure 4B:
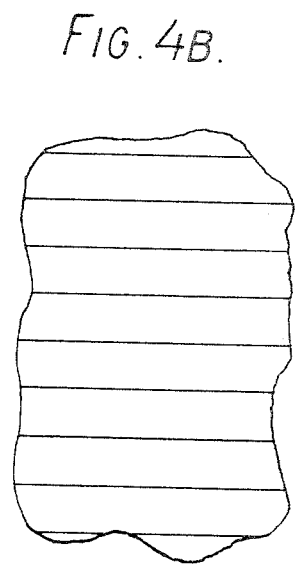
FIG. 4B is a rear view of the same screen material.

An alternative screen construction, giving greater overall brightness due to the use of a greater proportion of the projected light available, is shown in FIGS. 4A and 4B.

The screen material there shown has its rear face, that is the face directed to the right in FIG. 4A and towards the projector 3 in FIG. 2, made up of very narrow horizontal prism strips extending across the entire width of the screen 6.

An incident light ray 10 is shown, as for the screen material of FIG. 3.

In FIG. 4, however, the cone of emergent rays is not disposed about the line 10' as axis but about a line 11, disposed obliquely to the line 10' at an angle $\theta$. The cone of emergent rays is bounded by the rays 11' and 11'' subtending an angle $\alpha$.

The angle $\theta$ corresponds approximately to the angle $\theta$ shown in FIG. 2, which is the angle subtended by the line 11, joining the centre of mirror 7 with the centre of screen 6, and the line 10' representing the continuation beyond the screen 6 of the projector axis 10.

Using this prismatic form of screen material, the angle $\alpha$ of the emergent cone of rays, although it must still cover both pilots 1, 2, may be much reduced, compared with the screen material of FIG. 3, thus giving a brighter image.

A further alternative screen material is of the form shown in FIG. 5. In FIG. 5 there are shown three incident rays from projector 3 upon top, centre and bottom elemental areas A, B and C respectively of screen 6. For each element, the extension of line 10 is shown at 10' and the refracted median ray of the emergent cone of rays in shown at $11a$, $11b$ and $11c$ for the three areas A, B and C, respectively.

The oblique line $11b$ from area B subtends the angle $\theta_2$ with the corresponding line 10' and this corresponds to the angle $\theta$ of FIG. 4. However, the angle $\theta_1$ from the top A of the screen 6 is greater than $\theta_2$ and the angle $\theta_3$ from the bottom C of the screen 6 is less than $\theta_2$.

The values of the angles $\theta$ over the entire area of screen 6 are computed from the projector-screen-mirror geometry. The required angles are obtained by graduating the prism angles over the screen area, knowing the refractive index of the screen material.

The television projector 3, or all projectors 3, 4 and 5 as the case may be, have special optical and electrical characteristics for use in the system of FIGS. 1 and 2.

A television projector for normal viewing provides a rectangular image on a flat screen. Such a projector may comprise a high-intensity screen cathode ray tube and a Schmidt optical system having a concave mirror and a shaped, refracting correcting plate of, e.g., glass, for correcting aberration. The radius of curvature of the cathode ray tube face is normally one half that of the concave mirror.

The projector 3 of the apparatus of FIGS. 1 and 2 has a number of features specific to its present use.

In order to allow a shorter projection throw and to give a curved focal plane to the image produced by the Schmidt optical system of the television projector 3, alteration is required in the radius of curvature of the mirror, the figuring of the correction plate and the spacing of the optical elements of the projector. Thus, the radius of curvature of the mirror is increased by some 10 percent, the figuring of the correction plate is decreased by about 30 percent and the spacing between the cathode ray tube faceplate and mirror and the cathode ray tube faceplate and corrector plate is increased by about 10 percent.

The scanning raster of the cathode ray tube, or alternatively of the associated camera tube is made non-linear in order to introduce barrel distortion, keystone distortion and vertical non-linearity of the image on the cathode ray tube.

This distortion of the primary image projected onto the back projection screen is required to compensate for distortions produced by the mirror and screen configuration.

For the particular geometry of any practical system, it is possible to define the compensating distortion required in the tube image by computing the path of rays through the system for the whole image area. In this way, virtually all distortion in the system is corrected in the collimated view seen by the pilots.

When the additional projectors 4 and 5 are also used, raster distortion is required for all projectors and the raster distortion for projectors 4 and 5 is different from that of projector 3, but symmetrical and reversed from each other, assuming as equal-spaced location each side of projector 3. The outer projectors require horizontal keystone distortion also, to provide images which are greater in vertical extension at the inside than at the outside, and vertical line curvature corresponding to the curved screen 6.

It may here be noted that electron lens means are well-known for correcting inherent image distortion in television camera or receiver tubes, consistent with the customary use of linear raster scanning. Thus, when beam deflection is non-linear, pin-cushion or barrel distortion results. The raster correction which it is necessary to provide for the projectors 3, 4 and 5 may take advantage of such inherent distortion in the camera tube, cathode ray tube combination.

Time bases for the generation of non-linear scanning waveforms are well-known and such known circuit arrangements are suitable for carrying out the present invention.

Alternatively, it may be desired to use a type of television projector 3 in which the light which is projected to form the coloured image on the screen 6 all emerges from a single exit pupil. The necessity for different raster shape correction for three cathode ray tubes is then eliminated and a single correction of shape only is necessary, if substantially perfect image geometry is to be obtained. If no correction is applied, some distortion will occur, but this may be tolerated in some practical cases.

Further, if substantially perfect image geometry is required and if raster shaping is difficult to achieve with a particular type of projector, optical correction provides an alternative method.

Optical distortion of the required forms may be produced by the use of tilted lenses, tilted and curved mirrors, refracting wedges or prisms, or by combinations of these components. The position of the projector with respect to the screen may be adjusted to alter the relative amounts of the different distortions to be corrected. Thus, an upward shift of the projector introduces curvature horizontal lines and increases the keystone distortion necessary to be corrected. A shift of the projector inwardly towards the screen reduces, and may even over-correct, the barrel distortion necessary to be corrected.

Anamorphic optical systems are well-known in which a tilted prism is used to give anamorphic distortion of an image. Similar systems can also give non-linearity in the vertical direction and correct horizontal line curvature as may be required. Keystone distortion may be avoided, at the expense of introducing horizontal line curvature, by shifting the projector 3 downwardly, and the horizontal may then be straightened by means of the prism. A projector used in this way may have a small enough exit pupil for the depth of focus to be sufficient for the image to remain in focus over the screen, which is then at an angle to the normal to the projector axis. Alternatively, a tilted projector lens must be used for the whole image to be focussed.

Alternatively, a pair of tilted lenses, one positive and one negative, with an air space between them, may be used to provide the required optical correction.

Figure 7:
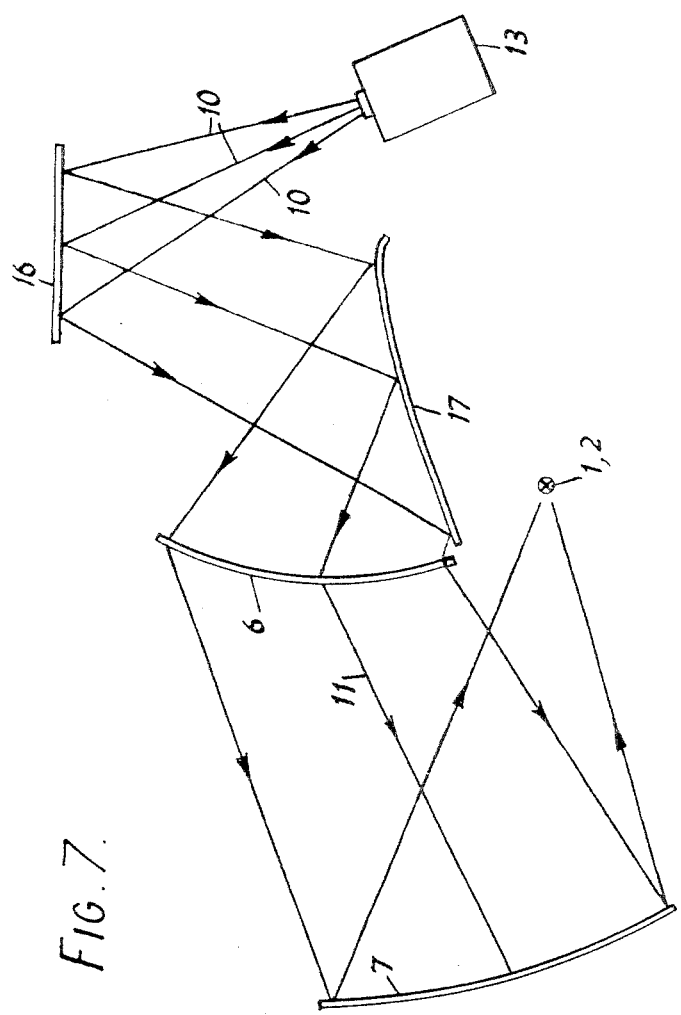
FIG. 7 is a diagram showing an alternative, modified form of the arrangement of FIGS. 1 and 2.

To make the optical system of FIGS. 1 and 2 more compact, one or more mirrors may be interposed in the projector light beam between the projector 3 and the screen 6. One such arrangement is shown in FIG. 6. The interposed mirrors may be slightly curved, for the purpose of providing the optical correction referred to above, and so provide an alternative to prisms or mirrors attached to the projector. Such an arrangement is shown in FIG. 7.

In FIG. 6, similar elements to those of FIGS. 1 and 2 are indicated by the same reference numerals. A colour television projector 13 produces an image on or near a tilted concave mirror 14, which itself images the exit pupil of the projector lens onto an auxiliary projection lens 15. This lens 15 produces the required distorted image on the back projection screen 6 by way of a flat folding mirror 16.

To obtain the optimum balance between the different forms of distortion required, the mirror 14 may be of a type consisting of a lens with silvered back surface, and may have toric rather than spherical surfaces. The lens 15 may be tilted slightly for optimum results.

In the arrangement of FIG. 6, the projection axis is a continuation of the line 11 joining the centre of the mirror 7 to the centre of the screen 6 and so the screen 6 need not have a special light deflecting structure, but must have light diffusing properties sufficient to spread out the transmitted light so that a uniformly illuminated image is perceived by both pilot and co-pilot.

In FIG. 7, similar elements to those of FIGS. 1, 2 and 6 are indicated by the same reference numerals. A colour television projector 13 projects an image onto a back-projection screen 6 by way of a first mirror 16, which has a flat reflecting surface, and by way of a second mirror 17, which has a curved reflecting surface shaped for the purpose of correcting optical distortion in the image.

In the arrangement of FIG. 7, the screen 6 is shown with the diffusing and deflecting properties of the screen 6 described with reference to FIG. 5.

The mirror 7 occupies the position of the mirror 7 of the arrangement of FIG. 2 and the apparatus is disposed generally in a similar manner to that shown in FIG. 2, above the heads of the pilot and co-pilot 1 and 2.

It will be appreciated that if the projector 3 is a cinematograph film projector, in place of the television projector of the embodiment of FIGS. 1 and 2, the optical forms of correction described would be used.

The shape of the screen 6 is spherical with a radius of curvature selected to give the best compromise for minimal electronic redesign of the cathode ray tube scan circuits, with ease of manufacture and yet still allow a shape which matches, as closely as possible, the focal surface of the collimating mirror. The shape arrived at in the example of FIGS. 1 and 2 is a section of a sphere of about 8 feet radius of curvature, which has linear dimensions of 5 feet high by just over 6 feet wide.

The screen is conveniently constructed by blow moulding a clear, cast acrylic shhet to shape and then chemically coating this sheet with a standard back projection screen material, in this case having a gain around unity to prevent obvious hot spot and colour shading effects and also to throw as much light as possible, using conventional screen material, down into the mirror 7 in the direction of the observers.

The screen 6 is rigidly supported by a framework around its perimeter which is fixed to a base frame allowing the screen 6 to be located accurately with respect to the collimating mirror 7.

The collimating mirror 7 of the visual display arrangement of FIGS. 1 and 2 has a special concave shape which forms part of the surface of a spheroid, or ellipse of rotation. This design is required to present a correct geometry picture with tolerable optical distortion to the two, or more, observers 1, 2, situated off the optical axis in both the vertical and horizontal planes.

The specifically shaped mirror 7 may be constructed by vacuum-forming an optically selected, cast acrylic sheet using specially shaped epoxy resin forming tools.

The required mirror finish is obtained by vacuum coating the concave side of the vacuum-formed acrylic sheet with aluminum, thus providing a front-surface coated mirror. Protection of the mirror surface can be obtained by vacuum evaporating silicon monoxide or magnesium fluoride over the aluminum, although a semi-protective natural oxide build-up occurs on the aluminium surface when it is exposed to air after vacuum coating. To prevent dust build-up on the mirror, due to any static attraction, a blanket of ionised air can be blown across the surface when the mirror is in use.

The mirror is totally supported by means of an epoxy and glass fibre reinforced plastic backing, which is built up from the construction tooling used to manufacture the vacuum-forming tools. In this way, continuity of shape is preserved, giving the acrylic mirror the intimate and total support required. The whole structure, mirror plus backing, is rigidly supported to a base frame by metal structures.

It will be understood that the dummy flight deck is mounted on a platform to which is imparted the accelerations characteristic of actual flight and, since the visual, display is operative during simulated flight, it is necessary in practice to move the entire optical system with the flight deck.

The projector 3, screen 6 and mirror 7 described are thus all securely mounted for movement with such a flight deck motion system.

We claim:

1. Visual display apparatus for providing a collimated visual display for viewing by at least one subject, comprising a concave mirror positioned for viewing by the subject, a curved rear-projection screen positioned substantially at the focal surface of the concave mirror and an optical projector positioned to project a visual scene onto the rear-projection screen.

2. Visual display apparatus as claimed in claim 1, in which the said optical projector is positioned with its axis directed towards the concave surface of the rear-projection screen and the said concave mirror, rear-projection screen and optical projector are further-positioned so that a line from the centre of the mirror to the point of intersection of the projector axis with the screen is oblique to the projector axis.

3. Visual display apparatus as claimed in claim 1, in which the axis of the optical projector is redirected by reflection at at least one mirror surface and the said redirected axis passes through the centre of the rear-projection screen and the centre of the concave mirror.

4. Visual display apparatus as claimed in claim 1, for providing a visual display for flight simulation apparatus comprising a dummy flight deck for housing a trainee pilot and co-pilot and for providing a collimated visual display for viewing by at least the trainee pilot, in which the said line from the centre of the mirror to the point of intersection of the projector axis with the screen is oblique to the projector axis in the vertical plane bisecting the said dummy flight deck and the said mirror, screen and projector are further positioned so that the line of view of the mirror by the said trainee pilot is substantially horizontal and the projector axis is positioned above the roof of the flight deck.

5. Visual display apparatus as claimed in claim 4, in which the said concave mirror is substantially spheroidal in shape, the axis of the spheroid of which the mirror forms a part lying substantially in the said vertical plane bisecting the dummy flight deck, the lower focus of the spheroid being substantially at the mid point of the volume of space from which the image is to be viewed, and the upper focus of the spheroid being above the dummy flight deck, whereby the axis of the spheroid is oblique to the vertical.

6. Visual display apparatus as claimed in claim 5 in which the optical projector is a closed-circuit television image projector provided with a television signal from a television camera positioned to view a model, thereby to provide the viewed visual display.

7. Visual display apparatus as claimed in claim 6, in which optical distortion of the television image due to the projector, screen and mirror optical system is compensated by the use of a non-linear scanning raster.

8. Visual display apparatus as claimed in claim 6, in which optical distortion of the television image due to the projector screen and mirror system is compensated by the use of image distorting means, comprising one or more lenses and/or refracting wedges and/or curved mirrors interposed between the optical projector and the back-projection screen.

9. Visual display apparatus as claimed in claim 8, in which the rear-projection screen has both deflecting and diffusing light-transmitting characteristics, whereby an incident light ray from the projector produces an emergent cone of rays, the axial ray of which cone is directed obliquely towards the said mirror.

10. Visual display apparatus as claimed in claim 9, in which the rear-projection screen has its face directed towards the optical projector made up of prism strips extending across the width of the screen.

11. Visual display apparatus as claimed in claim 9, in which the angle of the prism strips varies progressively from top to bottom of the screen.

* * * * *

Dedication 3,784,742.—*Donald Burnham*, Bletchley; *Samuel Walter Honeyball*, Aylesbury; *Archer Michael Spooner*, Henley; and *Daniel Richard Lobb*, Farnborough, England. GROUND-BASED FLIGHT SIMULATING APPARATUS. Patent dated Jan. 8, 1973. Dedication filed Oct. 23, 1984, by the assignee, *Redifon Ltd.*

Hereby dedicates to the Public the entire term of said patent.

[*Official Gazette January 1, 1985.*]